Nov. 7, 1961 — J. W. HORNER — 3,007,600
SEAL
Filed Jan. 27, 1958
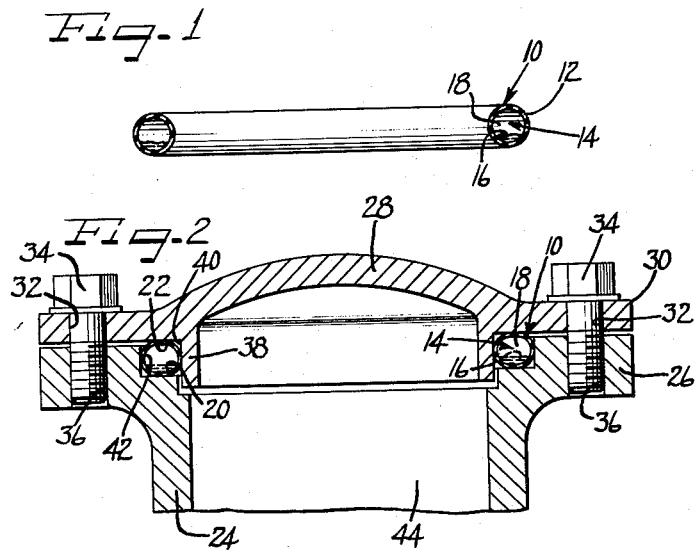
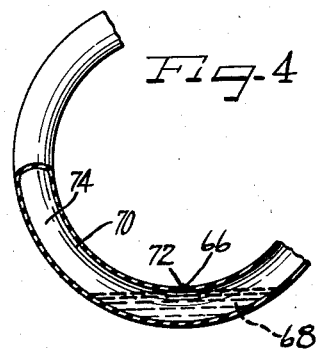
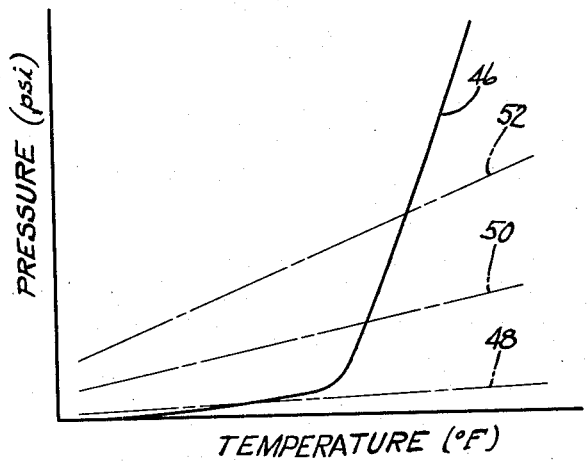
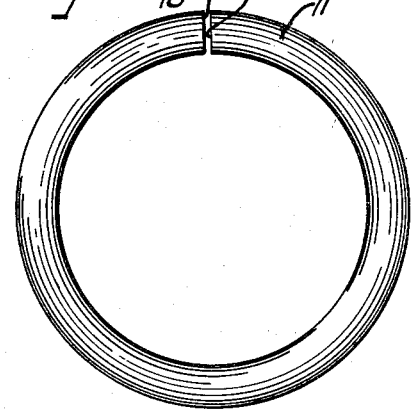
Inventor
John W. Horner United States Patent Office 3,007,600
Patented Nov. 7, 1961

1

3,007,600
SEAL
John W. Horner, Whittier, Calif., assignor to Thompson Ramo Wooldridge Inc., a corporation of Ohio
Filed Jan. 27, 1958, Ser. No. 711,518
3 Claims. (Cl. 220—46)

The present invention relates to improvements in pressure seals and more particularly to a hollow ring seal adapted to be clamped between opposed mating surfaces, and operative in high-pressure, high-temperature environments.

In one embodiment, the seal may take the form of a hollow annular ring having a tubular shaped enclosing wall formed of a thin, resilient, inelastic, temperature-resistant material, such as metal. The annular hollow seal is adapted to be clamped between opposing surfaces to operate to prevent the leakage of gases or fluids past the surfaces in high-pressure, extreme-temperature environments. The chamber within the hollow seal contains a small pool of liquid which is correlated in characteristics to the seal pressure required at the operating pressures encountered and correlated to the temperature environment. The remainder of the chamber within the seal is filled with a gas and is at atmospheric pressure at room temperature. With the elevation of temperatures to operating temperature, the pressure within the hollow chamber in the annular seal will increase as an accelerating function of the temperature to create a pressure within the chamber normal to the seal wall, to tend to expand it against the surfaces between which it is clamped. At room temperature between operations, the pressure returns to substantially atmospheric pressure to relax the metal wall of the seal. For reuse and to detect damage, the seal is weighed, and if the weight remains within the weight tolerance, reuse can be safely achieved, inasmuch as adequate liquid remains.

Annular pressure seals have been heretofore used with accompanying disadvantages inherent with the design. One type of seal which has been previously used is the thermal reacting chemical type, wherein an internal pressure is created by a chemical which reacts when a high temperature is encountered. The reaction makes it imperative to tolerate a high pressure within the seal at ordinary temperatures, and between use, so that the wall of the seal cannot relax. Furthermore, at extreme temperatures, dissociation of generated gas occurs, making the seal unusable after the first installation.

Other seals heretofore used have not employed internal pressure and have been given to deformation and collapse at elevated temperatures at very nominal pressures, making them unsatisfactory for very high pressure operation. These seals are incapable of creating sufficient pressures internally to counteract environmental pressure and to support a temperature weakened metal wall of the seal.

Other seals used have been loaded with a gas or have been completely filled with a liquid under super atmospheric conditions. These seals have been very difficult to fabricate, and require final sealing in an atmospheric equivalent to the pressure required in the seal. Further, at elevated temperatures, the seals will have a tendency to burst, and they will remain under stress at ordinary temperatures and pressures. An additional disadvantage is the accompanying inability to check this type of seal for reuse and damage will not be detected.

Accordingly, an object of the present invention is to provide a closed chamber with an elastic type of seal capable of use in extreme pressure and extreme temperature conditions, and which avoids the disadvantages encountered by seals of the type heretofore used.

Another object of the invention is to provide an improved hollow annular ring seal which is capable of safe

2 reuse, and can be readily and simply tested or checked to determine its safe operability.

A further object of the invention is to provide an improved hollow annular ring seal, with increased operating life, and wherein the wall of the seal relaxes when not in service.

A further object of the invention is to provide an improved hollow annular ring seal capable of operation under extreme pressure conditions and extreme temperature conditions wherein the internal pressure of the seal increases as an accelerating function of temperature.

Another object of the invention is to provide an improved method of sealing a gap between two opposing surfaces utilizing a pressure expandable hollow seal.

A further object of the invention is to provide an improved method of testing a closed, pressurized, high-temperature seal.

A feature of the invention is to provide a closed hollow annular ring seal with a metal wall with the chamber within the seal partially filled with a pool of liquid which may be corresponded in characteristics and amount to the pressure and temperature environment in which the seal will operate, and wherein the seal is at atmospheric pressure at room temperatures.

Other objects and advantages will become more apparent in the teaching of the principles of the invention in connection with the disclosure of the preferred embodiments thereof, in the specification, claims and drawings, in which:

FIGURE 1 is a cross sectional view taken on a vertical plane through a seal embodying the principles of the present invention;

FIGURE 2 is a vertical sectional view taken through a sealing assembly, illustrating the seal of FIGURE 1 in operation;

FIGURE 3 is a perspective view of a seal with portions broken away, illustrating a preferred form of fabricating the seal;

FIGURE 4 is an elevational view of the seal turned in an upright position and illustrating a preferred form of filling the sealing ring;

FIGURE 5 is a plan view of a seal illustrating another method of manufacturing the seal of the present invention; and, FIGURE 6 is a graphic showing of the performance of the seal of the present invention plotting temperature v. pressure, and comparing the seal with performance of seals of a type heretofore used.

As shown in the drawings:

FIGURE 1 illustrates a completed seal which is in the form of an annular hollow ring 10. While the principles of the present invention are well adapted to use and find particular advantage in the embodiments of a hollow annular seal, it will be recognized by those skilled in the art that other forms of the invention may be utilized.

The hollow annular ring seal 10 has a thin outer wall 12 which is substantially circular in cross section when the seal is unstressed. The thin outer wall is resilient in nature and is formed of a tough, thin, inelastic material, which is capable of withstanding high temperatures, and is preferably of metal.

The thin outer wall 12 forms a hollow annular chamber 14 therein. At the base of the chamber is a small amount of liquid shown in the form of a pool 16 at the base with the ring lying on its side as in FIGURE 1.

The remainder of the chamber or the volume 18 above the pool 16 is filled with a gas, such as air, which is at atmospheric pressure when at room temperature.

With the above seal construction, it will be recognized that the metal wall 12 is unstressed at normal room temperatures. The seal, between uses, when not exposed to high temperatures, will return to atmospheric pressure to relax the outer metal wall 12, thereby substantially increasing the operating life of the seal.

The seal is shown combined in an operating environment in FIGURE 2. In operation, the seal is confined between opposed surfaces, and prevents the escape of a pressurized gas or fluid between the gap formed by the spaced surfaces. As illustrated in FIGURE 2, the seal 10 is clamped between a first annular surface 20 and a second opposed annular surface 22 spaced therefrom. The first annular surface is formed on a hollow conduit or tube 24. The tube is provided with an annular flange 26 for the purposes of attaching another member shown in the form of a cap 28 to close the end of the tube 24. The cap 28 has a flanged edge 30 provided with an annular row of openings 32. These openings receive fastening bolts 34, which are screwed into threaded openings 36 in the flange 26 of the tube.

The cap is provided with an inwardly axially extending flange 38 which has an inner surface 40 lying along the inner periphery of the seal 10. The outer periphery of the seal engages an inwardly facing annular surface 42, which is formed by virtue of the fact that the annular surface 20 is recessed into the end of the tube 24.

Thus, the annular seal ring 10 is faced on four sides by surfaces. The surfaces 20 and 22 are are actual sealing surfaces, but are augmented by the radial facing surfaces 40 and 42 which aid in confining the seal 10. In installation, the bolts 34 are tightened to draw the cap 28 down to slack compressing engagement with the seal, and the internal pressure within the seal during operation will force the thin wall of the seal outwardly against the surfaces to provide a contact between the seal and the surfaces which prevents escape of gas or fluid from the interior 44 of the tube.

The installation, such as shown in FIGURE 2, is exemplary of an environment in which the seal is used, and high pressure and high temperatures will occur in the interior 44. The liquid pool 16 contains a liquid which is of an amount and has a characteristic wherein the vapor pressure will increase as an accelerating function of the increasing temperature. Thus, as the temperature reaches an extreme operating temperature, the pressure within the chamber 14 within the hollow annular sealing ring will reach the pressure necessary to create a force normal to the inner surface of the seal wall 12 to rigidify the wall and prevent its deformation and collapse. Adequate pressure is essential for this purpose due to the forces created by the internal pressure of the gas within the interior 44 of the tube, and because of the reduction in strength of the metal wall 12 which occurs at extreme temperatures.

Between operations in the installation shown in FIGURE 2, when the temperature drops, the vapor pressure of the fluid will drop back to substantially atmospheric pressure, and the metal wall 12 will relax. This, of course, will increase the service life of the seal.

The pressure relative to temperature is shown in the graph of FIGURE 6, with the characteristic of the present seal being plotted by the line 46. It will be seen from this graph that at room temperatures, the pressure will drop to atmospheric. As the temperature increases, the pressure will increase as an accelerating function of the temperature. Adequate liquid is provided to continue vaporization with temperature increase. The liquid is chosen that has a characteristic which will obtain the proper vapor pressure at the desired operating temperature, and which will meet the pressure requirements as the temperature is increasing to operating temperature.

The broken graph lines 48, 50 and 52 illustrate the performance characteristic of the seal of the type which has been filled under pressure, and is filled completely with a gas. It will be noted that the wall of the seal in each instance must be subjected to stress at room operating temperature, but yet at extreme operating temperatures the pressure does not approach the pressures obtainable with the use of the present invention, wherein a vapor pressure response within the chamber is utilized.

A further advantage of the present seal over a prepressurized seal is that in the latter there is no provision for detecting damage, and reuse cannot be safely accomplished.

In the present invention, a sufficient amount of liquid is formed in the pool to obtain a slight excess or a weight tolerance which will permit a slight leakage. For a reinstallation of the seal, the seal is checked by being weighed, and if the weight remains within this weight tolerance, its safe reuse is assured. In the case of large facilities where a substantial number of seals are employed and reused, an X-ray technique may be employed to determine the amount of liquid left in the pool within the seal. This technique also is not feasible with a prepressurized gas seal.

The present seal is superior and is uncomplicated in manufacture. In one form, as illustrated in FIGURE 3, the seal is formed in a first section 54, which is annular in shape and wherein the metal wall is semi-circular in cross section to form one-half of the seal. A second section 56 is of similar diameter, shape and configuration, and when placed in face-to-face mating relationship with the first portion 54, will form a complete tubular annular ring seal. The two sections are brought together and their inner edges 58 and 60 are joined along the inner periphery of the seal, such as by a weld. Their outer facing edges 62 and 64 are similarly joined such as by a weld which extends completely around the seal, and by this simple manufacturing process the seal is completed.

The seal is simply filled and prepared for operation by drilling or providing a small filling hole 66, as illustrated in FIGURE 4. In this filling hole, the liquid can be injected to the proper level, as illustrated at 68. In many instances, a smaller pool of liquid may be employed, or if a larger pool is desired, the ring 70 can be rotated so that the filling hole 66 will remain above the upper surface of the pool. When the pool has been injected and a sufficient amount is within the ring 70, the hole 66 is closed by seal 72 which bridges the hole and closes the interior of the ring. The remainder of the chamber 74, above the liquid pool 68, will remain filled with air. This air will mix with the vapor when the seal is operating at high temperatures.

Another form of constructing the body of the seal is illustrated in FIGURE 5. In this instance, an elongated, closed, hollow, cylindrical tube 76 is bent into an annular ring shape. The ends 78 and 80 of the tube are brought together in facing juxtaposition, and an annular weld is added to encircle the facing edges and complete the seal. If desired, the pool of liquid may be first injected into the open ends.

In operation of the seal, it is clamped in a groove or area formed by facing sealing surfaces, such as illustrated by the opposing surfaces 20 and 22, which face axially, and the opposing surfaces 40 and 42, which face radially, as shown in FIGURE 2. The annular hollow sealing ring 10 contains a pool 16 of liquid in the chamber 14 with the remainder of the chamber 18 being filled with a gas such as air, which is at substantially atmospheric pressure at room temperature. As the pressure in the area 44 within the tube 24 increases and operating temperature correspondingly increases, the temperature of the seal will increase, and the pressure in the chamber 14 within the seal will increase as an accelerating function of the temperature, as illustrated by the plotted line 46 on the graph of FIGURE 6. Between uses the pressure drops back to atmospheric with the drop in temperature and the outer wall 12 of the seal is, thus, relaxed between use. For reinstallation of the seal, it may be weighed to determine the adequacy of the remainder of the pool of liquid in the seal, so that its safe reuse can be accurately and positively determined.

Thus, it will be seen that I have provided an improved seal and method of sealing and testing a seal which meets the objectives and advantages hereinbefore set forth. The seal is capable of an increased operating life, and is further capable of continued safe reuse and can be accurately and precisely tested. Furthermore, the seal is simple and inexpensive to manufacture and prepare for use.

I have, in the drawings and specification, presented a detailed disclosure of the preferred embodiments of my invention, and it is to be understood that I do not intend to limit the invention to the specific form disclosed, but intend to cover all modifications, changes and alternative constructions and methods falling within the scope of the principles taught by my invention.

I claim as my invention:

1. A seal adapted for repeated cycles of high temperature use within a closed periphery channel defined by two mating parts to be sealed and said parts providing adjustable cooperating surfaces enveloping the seal, said seal comprising a hollow tubular casing composed of strong flexible substantially inelastic material such as metal and sized when cool to sealingly fit in the enveloping channel without appreciably stressing the casing or mating parts forming the channel, means adjusting the cooperating surfaces into slight compressing engagement with said casing, a pool of liquid filling only the bottom portion of the casing when the casing is cool, a gas filling the rest of the casing at substantially atmospheric pressure when the casing is cool to minimize stressing of the cool casing, said liquid having a vapor pressure such as to vaporize and form vapors mixing with the gas to develop a relatively high positive internal pressure in the casing effective to force the casing into tight sealing relation with the surfaces of the channel to seal the mating parts whenever the parts and casing are at high operating temperatures, said liquid being present in sufficient amounts to develop the desired internal pressure at said high operating temperatures even after some leakage may occur from repeated use, and said vapors developed in the casing condensing upon cooling of the casing to separate from the gas and return to the pool to relax the stress on the casing and parts whereupon the gas filling the casing above the pool will be effective to avoid development of negative pressures tending to collapse the casing upon cooling from a high operating temperature.

2. The seal of claim 1 wherein the casing is a two-piece metal annulus with each piece being semi-circular in cross-section and mated with the other piece by a welded joint seam along the inner and outer peripheries of the annulus.

3. The seal of claim 1 wherein the casing is a metal tube in the shape of an annulus and having abutting ends joined together with an annular weld seam.

References Cited in the file of this patent

UNITED STATES PATENTS

| | | |
|---|---|---|
| 1,917,175 | Wills et al. | July 4, 1933 |
| 1,966,202 | Pfefferle | July 10, 1934 |
| 2,737,405 | Shinn | Mar. 6, 1956 |
| 2,814,517 | Razdow | Nov. 26, 1957 |
| 2,837,360 | Ladd | June 3, 1958 |
| 2,838,328 | Rohrberg | June 10, 1958 |

FOREIGN PATENTS

| | | |
|---|---|---|
| 696,684 | Great Britain | Sept. 9, 1953 |